US011992040B2

(12) United States Patent
Yang et al.

(10) Patent No.: US 11,992,040 B2
(45) Date of Patent: May 28, 2024

(54) TUBE FILTER PRODUCTION DEVICE AND TUBE FILTER PRODUCTION METHOD

(71) Applicant: KT&G CORPORATION, Daejeon (KR)

(72) Inventors: Jin Chul Yang, Daejeon (KR); Jong Yeol Kim, Daejeon (KR); Soo Ho Kim, Daejeon (KR); Bong Su Cheong, Daejeon (KR); Ki Jin Ahn, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 634 days.

(21) Appl. No.: 17/264,398

(22) PCT Filed: Aug. 27, 2020

(86) PCT No.: PCT/KR2020/011440
§ 371 (c)(1),
(2) Date: Jan. 29, 2021

(87) PCT Pub. No.: WO2021/125497
PCT Pub. Date: Jun. 24, 2021

(65) Prior Publication Data

US 2022/0304370 A1 Sep. 29, 2022

(30) Foreign Application Priority Data

Dec. 19, 2019 (KR) ........................ 10-2019-0170671
Apr. 27, 2020 (KR) ........................ 10-2020-0050649

(51) Int. Cl.
*A24D 3/00* (2020.01)
*A24D 3/02* (2006.01)
(Continued)

(52) U.S. Cl.
CPC ........... *A24D 3/025* (2013.01); *A24D 3/0279* (2013.01); *A24D 3/048* (2013.01); *A24D 3/14* (2013.01); *B31D 5/0086* (2013.01)

(58) Field of Classification Search
CPC ...... A24D 3/025; A24D 3/0279; A24D 3/048; A24D 3/14; B31D 5/0086; B31D 5/0082
See application file for complete search history.

(56) References Cited

U.S. PATENT DOCUMENTS 3,774,508 A * 11/1973 Berger ................ A24D 3/0283 493/47
3,847,064 A * 11/1974 Berger ................ A24D 3/0225 493/47
(Continued)

FOREIGN PATENT DOCUMENTS

EP 2548625 B1 6/2018
JP 2005-537814 A 12/2005
(Continued)

OTHER PUBLICATIONS

Communication dated Dec. 20, 2021 from the Korean Patent Office in Korean Application No. 10-2020-0050649.
(Continued)

*Primary Examiner* — Steven O Douglas
(74) *Attorney, Agent, or Firm* — Sughrue Mion, PLLC

(57) ABSTRACT

According to embodiments of the present invention, there is provided a tube filter production device including a tube filter exterior forming case into which one or more filter tows are introduced and from which a tubular rod formed from the one or more filter tows is discharged, a tube filter forming bar extending in an inner region of the tube filter exterior forming case in order to form a hollow of the tubular rod, and a steam chamber having at least one steam nozzle in communication with the inner region of the tube filter exterior forming case and configured to supply steam to the
(Continued)

one or more filter tows through the steam nozzle, wherein the tube filter forming bar has a duct extending in a longitudinal direction of the tube filter forming bar and a flavoring nozzle formed in a downstream end region of the tube filter forming bar to deliver a flavoring liquid or a moisturizing liquid supplied through the duct to the hollow of the tubular rod.

13 Claims, 3 Drawing Sheets

(51) Int. Cl.
*A24D 3/04* (2006.01)
*A24D 3/14* (2006.01)
*B31D 5/00* (2017.01)

(56) References Cited

U.S. PATENT DOCUMENTS

| | | | | | |
|---|---|---|---|---|---|
| 4,179,323 | A * | 12/1979 | Sigmon | A24D 3/0279 156/201 |
| 4,281,671 | A * | 8/1981 | Bynre | A24D 3/0212 428/375 |
| 4,312,698 | A * | 1/1982 | Gergely | A24C 5/1807 493/42 |
| 4,344,382 | A * | 8/1982 | Hausler | D06B 1/02 118/325 |
| 4,476,807 | A * | 10/1984 | Pryor | A24D 3/022 239/338 |
| 5,911,224 | A * | 6/1999 | Berger | A24D 3/08 493/42 |
| 8,353,811 | B2 * | 1/2013 | Shen | A24B 15/282 493/47 |
| 2019/0315500 | A1 * | 10/2019 | Duong | B64G 1/506 |

FOREIGN PATENT DOCUMENTS

| | | | |
|---|---|---|---|
| KR | 10-2005-0005249 | A | 1/2005 |
| KR | 10-2015-0064199 | A | 6/2015 |
| KR | 10-2017-0031766 | A | 3/2017 |
| KR | 10-2018-0088374 | A | 8/2018 |
| KR | 10-2019-0038178 | A | 4/2019 |
| WO | 2016/079469 | A1 | 5/2016 |

OTHER PUBLICATIONS

Extended European Search Report dated Dec. 15, 2021 in European Application No. 20811950.3.
Korean Written opinion for PCT/KR2020/011440 dated Nov. 30, 2020.
Korean international search report for PCT/KR2020/011440 dated Nov. 30, 2020.

* cited by examiner

[Fig.1]
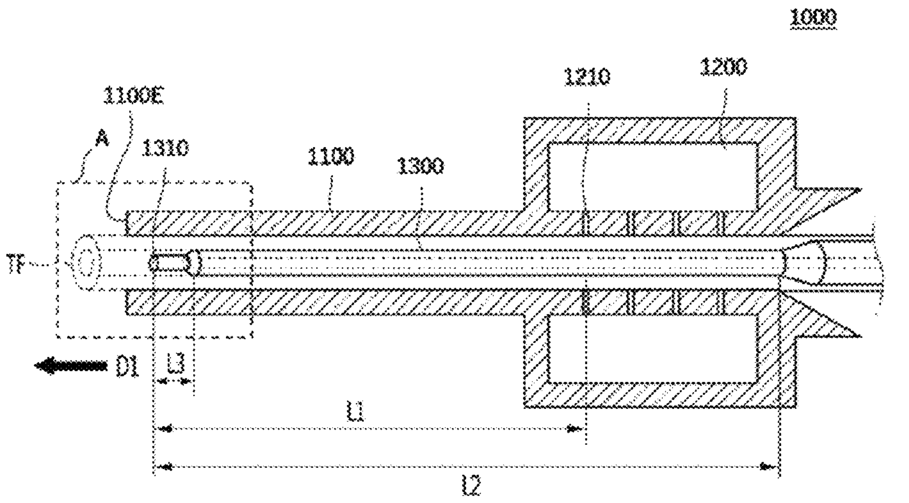
[Fig.2]
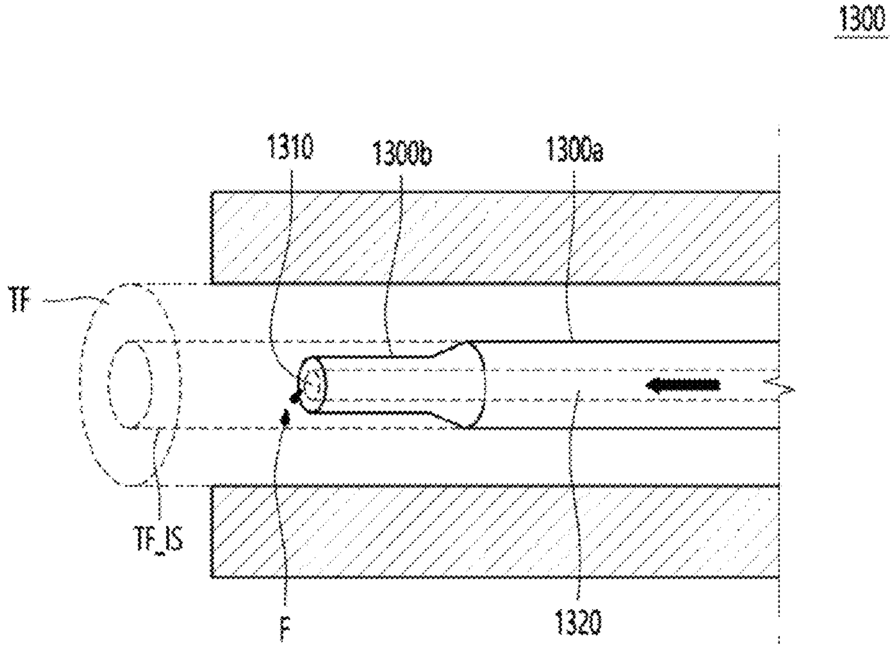

[Fig.3]
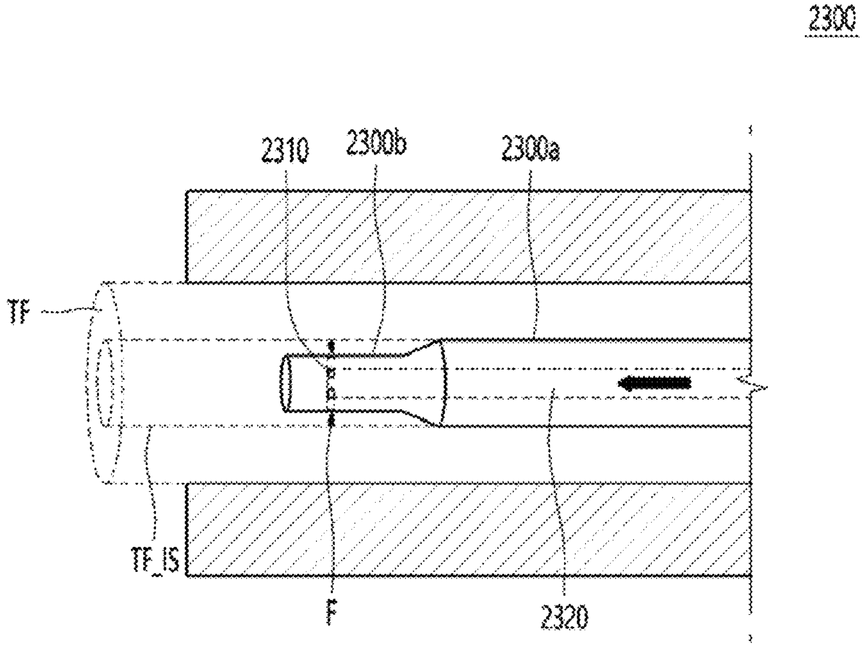
[Fig.4]
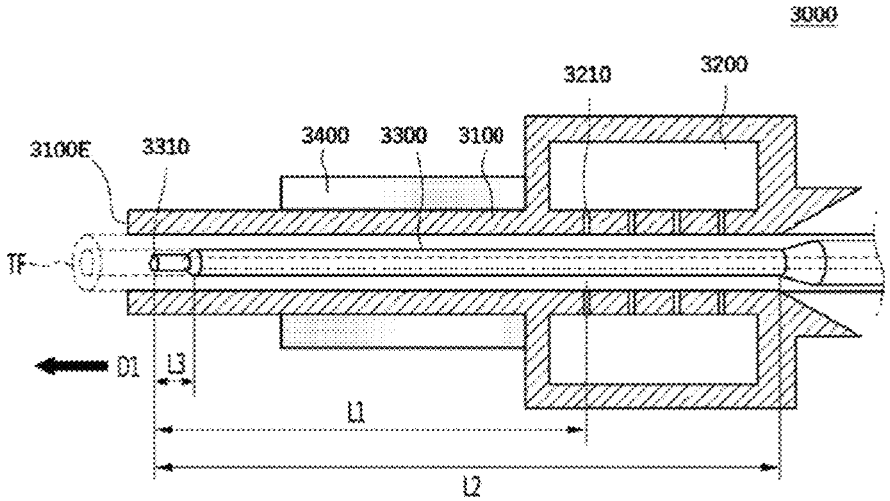

[Fig.5]
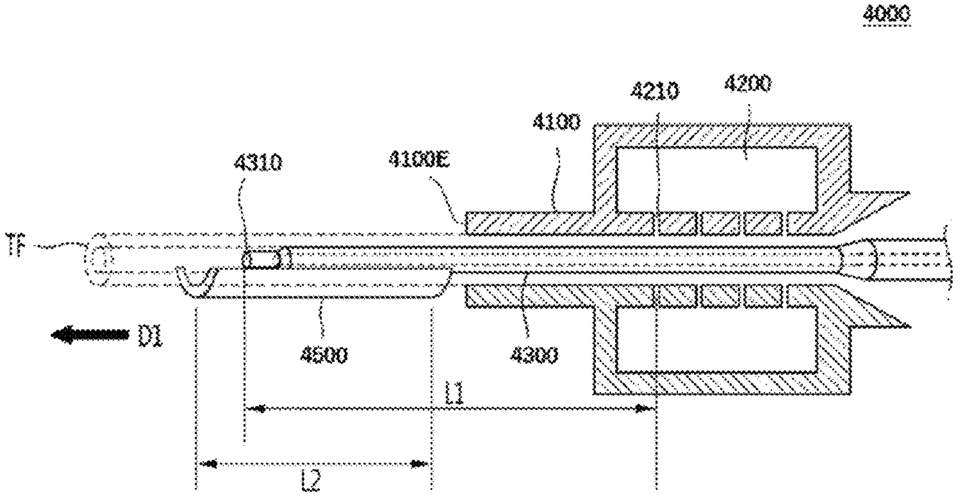
[Fig.6]
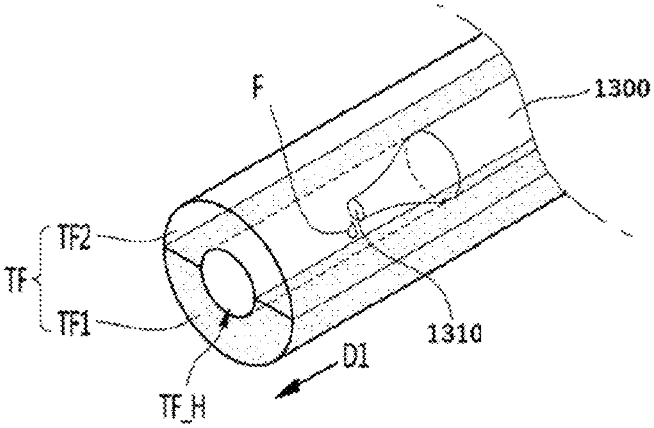
[Fig.7]
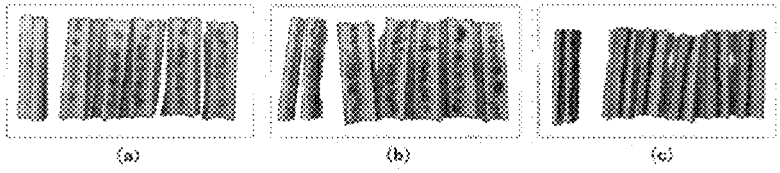

TUBE FILTER PRODUCTION DEVICE AND TUBE FILTER PRODUCTION METHOD

CROSS-REFERENCE TO RELATED APPLICATIONS

This application is a National Stage of International Application No. PCT/KR2020/011440 filed Aug. 27, 2020, which claims priority under U.S.C. § 119(a) to Korean Patent Application No. 10-2019-0170671 filed on Dec. 19, 2019 and No. 10-2020-0050649 filed on Apr. 27, 2020.

TECHNICAL FIELD

The present invention relates to a device and method for producing a tube filter, and more particularly, to a device and method for producing a tube filter that is flavored and/or moisturized through a hollow.

BACKGROUND ART

Research has been carried out on technologies for adding a flavor to an aerosol provided from a cigarette. For example, in order to allow a flavor to be added to an aerosol, a transfer jet nozzle system (TJNS) filter or the like in which a flavor is sprayed onto a filter constituting a cigarette has been utilized in cigarette production.

Meanwhile, in the conventional case in which a flavoring liquid is added into a filter through an outer surface of the filter, since the flavoring liquid may spread to cigarette paper surrounding an outer portion of the filter and thus the outer portion may be contaminated, there is a limitation in the amount of flavoring liquid that may be added during the production process. Also, there may be a problem in that the amount of menthol delivered during smoking may sharply decrease over time as menthol applied to an inner portion of the filter spreads to an adjacent non-flavored tube filter or the like.

DISCLOSURE

Technical Problem

The present invention is directed to providing a tube filter production device and a tube filter production method capable of, while maximizing the taste of tobacco smoke through increasing a delivery amount of menthol, a delivery amount of nicotine, and vapor production, reducing a flavor loss rate and improving flavor persistence during smoking.

Objectives of the present invention are not limited to the above-mentioned objectives, and other unmentioned objectives should be clearly understood by those of ordinary skill in the art to which the present invention pertains from the description below.

Technical Solution

Some embodiments of the present invention provide a tube filter production device for producing a smoking article tube filter, the tube filter production device including a tube filter exterior forming case into which one or more filter tows are introduced and from which a tubular rod formed from the one or more filter tows is discharged, a tube filter forming bar extending in an inner region of the tube filter exterior forming case and configured to form a hollow of the tubular rod, and a steam chamber having at least one steam nozzle in communication with the inner region of the tube filter exterior forming case and configured to supply steam to the one or more filter tows through the steam nozzle, wherein the tube filter forming bar has a duct extending in a longitudinal direction of the tube filter forming bar and a flavoring nozzle formed in a downstream end region of the tube filter forming bar and configured to deliver a flavoring liquid or a moisturizing liquid supplied through the duct to the hollow of the tubular rod.

The flavoring nozzle may allow the flavoring liquid or moisturizing liquid supplied through the duct to free-fall toward a lower region of an inner side surface of the tubular rod or eject the flavoring liquid or moisturizing liquid supplied through the duct in a radial direction such that the flavoring liquid or the moisturizing liquid supplied through the duct is absorbed into an entire region of the inner side surface of the tubular rod.

In some embodiments, the tube filter forming bar may include a forming bar body portion and a forming bar tip coupled to a downstream end of the forming bar body portion, and the forming bar tip may include a second duct that is in fluid communication with a first duct formed in the forming bar body portion and has a diameter smaller than or equal to a diameter of the first duct. Here, the diameter of the first duct may be in a range of 1.5 mm to 4 mm, and the diameter of the second duct may be in a range of 0.8 mm to 2.5 mm. Meanwhile, the forming bar tip may be screw-coupled to the forming bar body portion.

In some embodiments, the flavoring nozzle of the tube filter forming bar may be spaced apart from the steam nozzle by a distance of 180 mm to 600 mm in a downstream direction. In a case in which the steam chamber has a plurality of steam nozzles, the flavoring nozzle of the tube filter forming bar may be spaced apart from a first steam nozzle located most downstream among the plurality of steam nozzles by a distance of 180 mm to 600 mm in the downstream direction.

In some embodiments, an inner diameter of the tube filter exterior forming case may be in a range of 3 mm to 10 mm, an outer diameter of the tube filter forming bar may be in a range of 2 mm to 4.5 mm, and an inner diameter of the tube filter forming bar may be in a range of 0.8 mm to 2 mm.

Meanwhile, the tube filter production device may further include a cooling member configured to cool the tubular rod directly or indirectly, and the cooling member may be located between the steam nozzle and the flavoring nozzle.

Also, the tube filter production device may further include a conveying member configured to convey the tubular rod discharged from the tube filter exterior forming case, the tube filter forming bar may extend downstream to protrude from a downstream end of the tube filter exterior forming case, and the flavoring nozzle may be disposed in a region that overlaps with the conveying member.

Here, the conveying member may be a suction rail having a suction unit configured to discharge air and moisture inside the tubular rod to the outside of the tubular rod, and the flavoring nozzle may be disposed to be closer to a downstream end of the suction rail than to an upstream end of the suction rail.

Also, some embodiments of the present invention provide a tube filter production method including guiding at least one filter tow to be formed into a shape of a tubular rod by using a tube filter exterior forming case that defines an outer shape of the tubular rod and a tube filter forming bar that defines a hollow inside the tubular rod, spraying steam onto the at least one filter tow through a steam nozzle in communication with an inner portion of the tube filter exterior forming case to harden the at least one filter tow in the shape of the tubular rod, and supplying a flavoring liquid or a moisturizing liquid supplied from a duct inside the tube filter forming bar to the hollow of the tubular rod through a flavoring nozzle formed at a downstream end of the tube filter forming bar.

The tube filter production method may further include, between the spraying of the steam and the supplying of the flavoring liquid or the moisturizing liquid, bringing the tubular rod in contact with outside air to naturally cool the tubular rod or cooling the tubular rod by a cooling member separately provided between the steam nozzle and the flavoring nozzle.

Also, the tube filter production method may further include a suction step in which conveying the tubular rod discharged from the tube filter exterior forming case and discharging air and moisture inside the tubular rod to the outside of the tubular rod are performed simultaneously, and the flavoring liquid or the moisturizing liquid may be supplied to the tubular rod while the suction step is performed.

In some embodiments, the flavoring liquid or the moisturizing liquid may be supplied at an amount in a range of 0.3 mg to 1.0 mg per 1 mm to the hollow of the tubular rod.

Advantageous Effects

In a case in which an inner portion of a tube filter is flavored according to embodiments of the present invention, it is possible to apply a larger maximum amount of flavoring liquid into the filter, as compared to the conventional transfer jet nozzle system (TJNS) flavoring method. Specifically, considering that the maximum amount of flavoring liquid that may be applied in the conventional TJNS flavoring method is in a range of about 0.5 mg/mm to 0.8 mg/mm, it is possible to apply a maximum amount of flavoring liquid that is about 1.2 times to 2 times larger, as compared to the conventional TJNS flavoring method.

Also, when the tube filter having a flavored inner portion according to embodiments of the present invention is employed to a cigarette, a rate of loss of menthol applied to a TJNS filter that occurs during a cigarette storage period can be reduced, and simultaneously, an amount of menthol delivered to a shredded tobacco portion can be increased. Thus, the menthol taste of tobacco smoke can be enhanced during smoking.

Further, since a flavoring liquid is caused to free-fall into a hollow of the tube filter in order to flavor the inner portion of the tube filter according to embodiments of the present invention, the flavoring liquid can be evenly added at a sufficient amount into the tube filter without a complex spray nozzle or the like for spraying the flavoring liquid into the hollow of the tube filter. Thus, the tube filter production process can be simplified and economic feasibility can be secured.

In addition, when a flavoring method, a flavoring liquid processing speed, a flavoring nozzle diameter, a separation distance between a flavoring nozzle and a steam nozzle, and the like according to the present invention are applied to the tube filter production process, flavor loss due to high-temperature steam can be minimized.

DESCRIPTION OF DRAWINGS

FIG. 1 is a schematic diagram for describing a tube filter production device according to some embodiments of the present invention, and FIG. 2 is an enlarged view of region A of FIG. 1.

FIGS. 3 to 5 are schematic diagrams for describing tube filter production devices according to some other embodiments of the present invention.

FIG. 6 is a view illustrating an example of a state in which an inner portion of a smoking article tube filter is being flavored according to some embodiments of the present invention.

FIG. 7 shows pictures in which a first region of a tube filter was cut and unfolded to check whether an inner portion of the tube filter was uniformly flavored.

MODES OF THE INVENTION

Hereinafter, exemplary embodiments of the present invention will be described in detail with reference to the accompanying drawings. Advantages and features of the present invention and a method of achieving the same should become clear with embodiments described in detail below with reference to the accompanying drawings. However, the present invention is not limited to embodiments disclosed below and may be implemented in various other forms. The embodiments make the disclosure of the present invention complete and are provided to completely inform one of ordinary skill in the art to which the present invention pertains of the scope of the invention. The present invention is defined only by the scope of the claims. Like reference numerals refer to like elements throughout.

Unless otherwise defined, all terms including technical or scientific terms used herein have the same meaning as commonly understood by those of ordinary skill in the art to which the present invention pertains. Terms defined in commonly used dictionaries should not be construed in an idealized or overly formal sense unless expressly so defined herein.

Also, in the specification, a singular expression includes a plural expression unless the context clearly indicates otherwise. The terms "comprises" and/or "comprising" used herein do not preclude the presence of or the possibility of adding one or more elements, steps, operations, and/or devices other than those mentioned.

Terms including ordinals such as "first" or "second" used herein may be used to describe various elements, but the elements are not limited by the terms. The terms are only used for the purpose of distinguishing one element from another element.

Throughout the specification, "smoking article" may refer to anything capable of generating an aerosol, such as tobacco (cigarette) and cigar. The smoking article may include an aerosol-generating material or an aerosol-forming substrate.

Also, in description of a tube filter production device, "downstream" or "downstream direction" refers to a direction in which a tube filter or a tow supplied to produce a tube filter advances, and "upstream" or "upstream direction" refers to a direction opposite thereto. For example, in a tube filter production device 1000 illustrated in FIG. 1, a tubular rod TF is discharged from the upstream to the downstream direction (direction D1) of the tube filter production device 1000, and a flavoring nozzle 1310 is located downstream of a steam chamber 1200 or a steam nozzle 1210.

FIG. 1 is a schematic diagram for describing a tube filter production device according to some embodiments of the present invention, and FIG. 2 is an enlarged view of region A of FIG. 1. For clear description of the tube filter production device 1000 illustrated in FIGS. 1 and 2, each component has been simplified and exaggerated, and components not essential in describing the present invention have been omitted.

Referring to FIG. 1, the tube filter production device 1000 may include a tube filter exterior forming case 1100, the steam chamber 1200, and a tube filter forming bar 1300.

Although not illustrated, the tube filter production device 1000 may include a tow supply portion configured to supply two filter tows, which are materials used in producing a tube filter, into the tube filter exterior forming case 1100 while the tube filter forming bar 1300 is placed between the two filter tows.

Also, before the filter tows are supplied into the tube filter exterior forming case 1100, the filter tows may undergo, through a preprocessor or the like, a preprocessing process that is necessary for the filter tows to be produced into a tube filter. For example, the filter tows may be moved to a stretching machine through a roller, and the stretching machine may stretch the filter tows and then supply the filter tows into the tube filter exterior forming case 1100.

Further, in some embodiments, compressed air that allows the filter tows to easily enter the tube filter exterior forming case 1100 and advance in the downstream direction may be supplied into the tube filter exterior forming case 1100.

Meanwhile, the filter tows may include a plasticizer such as triacetin that may harden the tubular rod TF and maintain the shape thereof. The amount of plasticizer added during production of the tubular rod TF of the present invention may be in a range of about 19% to 24%, which is larger than the amount of plasticizer added during production of a non-tubular cellulose acetate filter (that is, for example, in a range of about 6% to 15%).

In the tube filter production device 1000, the filter tows may move at a speed in a range of about 500 rods per minute (RPM) to 1,200 RPM. 1 RPM refers to a speed at which the filter tows pass one rod per minute, and one rod may have a length in a range of about 60 mm to 140 mm, but the present invention is not limited thereto.

An inner surface of the tube filter exterior forming case 1100 may have a cylindrical shape, which forms an outer surface of the tubular rod TF. That is, the filter tows may be combined and hardened by high-temperature steam while moving inside the tube filter exterior forming case 1100 and formed into the tubular rod TF.

Meanwhile, as illustrated, the tube filter forming bar 1300 that has a bar shape is disposed inside the tube filter exterior forming case 1100. Accordingly, the tubular rod TF may have a cylindrical shape having a hollow formed therein. The tubular rod TF formed by the tube filter production device 1000 may undergo a subsequent process, such as cutting, to be completely formed into a plurality of separate tube filters.

Here, the tube filter exterior forming case 1100 may serve to define the outer surface of the tubular rod TF, and the tube filter forming bar 1300 may serve to define the hollow inside the tubular rod TF.

Accordingly, an inner diameter of the tube filter exterior forming case 1100 may be set according to an outer diameter of a tube filter to be produced, and an outer diameter of the tube filter forming bar 1300 may be set according to an inner diameter (that is, the size of the hollow) of the tube filter to be produced. Also, an inner diameter (that is, the size of the flavoring nozzle) of the tube filter forming bar 1300 may be appropriately set according to the amount of flavoring liquid, such that the flavoring liquid is uniformly added into the hollow of the tube filter and a duct blockage is prevented. For example, the inner diameter of the tube filter exterior forming case 1100 may be in a range of about 3 mm to 10 mm, the outer diameter of the tube filter forming bar 1300 may be in a range of about 2 mm to 4.5 mm, and the inner diameter of the tube filter forming bar 1300 may be in a range of about 0.8 mm to 2 mm.

The steam chamber 1200 may serve to supply high-temperature steam to the filter tows conveyed inside the tube filter exterior forming case 1100 to combine and harden the filter tows so that the filter tows are formed into the tubular rod. Specifically, the high-temperature steam supplied to the filter tows may harden the plasticizer included in the filter tows and maintain the shape of the tubular rod.

The steam from the steam chamber 1200 may be supplied to the filter tows by the steam nozzle 1210 that is in communication with an inner portion of the tube filter exterior forming case 1100. As illustrated, the steam nozzle 1210 may supply steam to each of an upper inner portion and a lower inner portion of the tube filter exterior forming case 1100, but the present invention is not limited thereto. Although not illustrated, steam connectors configured to allow high-temperature steam supplied from the outside to enter the steam chamber 1200 may be formed in the steam chamber 1200.

In some embodiments, the steam nozzle 1210 may supply steam at a temperature in a range of about 50° C. to 200° C. to the filter tows, but the present invention is not limited thereto.

A flavoring duct 1320 extending in a longitudinal direction of the tube filter forming bar 1300 is formed inside the tube filter forming bar 1300. The flavoring nozzle 1310 that may supply a flavoring liquid or a moisturizer into the hollow inside the tubular rod TF may be formed at a downstream end of the tube filter forming bar 1300 (that is, an end thereof near an outlet of the tubular rod TF). The flavoring nozzle 1310 may cause the flavoring liquid or moisturizer supplied through the flavoring duct 1320 to free-fall into the hollow inside the tubular rod TF. The free-falling flavoring liquid or the like may be absorbed and diffused to the tubular rod TF through an inner side surface TFNS of the tubular rod TF.

Meanwhile, in the present specification, for the sake of clear description and simplification of terms, a nozzle supplying the flavoring liquid or moisturizer is referred to as the flavoring nozzle 1310, but, of course, the flavoring nozzle 1310 may be a nozzle that supplies a moisturizing liquid such as glycerin and/or propylene glycol in addition to supplying a flavoring liquid such as menthol.

In some embodiments, as illustrated in FIG. 2, the tube filter forming bar 1300 may have a structure in which a forming bar body portion 1300*a* and a forming bar tip 1300*b* are coupled. For example, the forming bar tip 1300*b* may be screw-coupled to the forming bar body portion 1300*a*, and an inner duct of the forming bar body portion 1300*a* may be connected to an inner duct of the forming bar tip 1300*b* while in fluid communication therewith. In this case, the flavoring nozzle 1310 may be located at a downstream end of the forming bar tip 1300*b*.

Meanwhile, in FIG. 2, an inner diameter of the forming bar body portion 1300*a* and an inner diameter of the forming bar tip 1300*b* are illustrated as being equal, but the present invention is not limited thereto.

In some embodiments, the inner diameter of the forming bar tip 1300*b* may be smaller than the inner diameter of the forming bar body portion 1300*a*. That is, an inner diameter of the flavoring duct 1320 of the tube filter forming bar 1300 may not be constant in a region between the forming bar body portion 1300*a* and the forming bar tip 1300*b*. For example, the inner diameter of the forming bar body portion 1300*a* may be in a range of about 1.5 mm to 4 mm, and the inner diameter of the forming bar tip 1300*b* (that is, the inner diameter of the flavoring nozzle 1310) may be in a range of about 0.8 mm to 2.5 mm. In this case, in order to facilitate a fluid flow of the flavoring liquid or the like, the inner diameter of the forming bar tip 1300*b* may gradually decrease in a downstream direction.

In some embodiments, the flavoring nozzle 1310 may be disposed downstream of the steam nozzle 1210 as illustrated, and the flavoring nozzle 1310 may be disposed to be spaced apart from the steam nozzle 1210 by a distance in a range of about 180 mm to 600 mm, preferably, in a range of about 300 mm to 600 mm. That is, a separation distance L1 between the flavoring nozzle 1310 and the steam nozzle 1210 may be in a range of about 180 mm to 600 mm. In the case in which a plurality of steam nozzles are provided as illustrated in FIG. 1, the separation distance may be based on a steam nozzle located most downstream among the steam nozzles (that is, a steam nozzle which is the closest to the flavoring nozzle, among the steam nozzles).

By setting the separation distance L1 between the flavoring nozzle 1310 and the steam nozzle 1210 as described above, a flavor loss rate of the tube filter may be minimized. This will be described in detail below.

In some embodiments, the diameter of the flavoring nozzle 1310 may be in a range of 0.1 mm to 5 mm, preferably, 0.8 mm to 2.5 mm.

Meanwhile, the diameter of the flavoring nozzle 1310 and the diameter of the duct formed in the tube filter forming bar 1300 may be different from each other. For example, the diameter of the duct may be 4 mm, and the diameter of the flavoring nozzle 1310 may be a numerical value smaller than the diameter of the duct, e.g., 2 mm. Also, in order to allow the diameter of the flavoring nozzle 1310 to be easily adjusted as necessary in the production process, a forming bar tip may be coupled to the downstream end of the tube filter forming bar 1300 by a screw coupling method. For example, a length L3 of the forming bar tip may be in a range of 10 mm to 50 mm, but the present invention is not limited thereto.

In some embodiments, a length L2 of the tube filter forming bar 1300 (here, L2 may also be defined as a separation distance from the downstream end of the tube filter forming bar 1300 to an upstream-side inlet of the tube filter exterior forming case 1100) may be in a range of about 300 mm to 400 mm. Meanwhile, the tube filter forming bar 1300 having the length L2 may be produced by first forming the flavoring duct 1320 inside a bar of which an outer diameter is larger than or equal to about 5 mm and grinding the bar so that the outer diameter of the tube filter forming bar 1300 is reduced from about 5 mm or larger to 4.2 mm or less.

In some embodiments, the flavoring nozzle 1310 may be disposed upstream of a downstream end 1100E of the tube filter exterior forming case 1100 as illustrated in FIG. 1, but the present invention is not limited thereto. For example, the flavoring nozzle 1310 may be located to be substantially collinear with the downstream end 1100E of the tube filter exterior forming case 1100. As another example, the flavoring nozzle 1310 may be disposed downstream of the downstream end of the tube filter exterior forming case 1100 as illustrated in FIG. 5.

FIG. 3 is a schematic diagram for describing a tube filter forming bar of a tube filter production device according to some other embodiments of the present invention.

Referring to FIG. 3, a tube filter forming bar 2300 may have a structure in which a forming bar body portion 2300*a* and a forming bar tip 2300*b* are coupled, and the forming bar tip 2300*b* may have a flavoring nozzle 2310 configured to eject a flavoring liquid delivered from the flavoring duct 1320 in a radial direction.

For example, the flavoring nozzle 2310 may spray the flavoring liquid with a constant pressure. In this case, the sprayed flavoring liquid may be evenly absorbed into the entire region of the inner side surface TF_IS of the tubular rod TF. As another example, the flavoring nozzle 2310 may eject the flavoring liquid in the radial direction, and the ejected flavoring liquid may flow down along a wall surface of the forming bar tip 2300*b* and free-fall to a lower region of the inner side surface TF_IS of the tubular rod TF. In this case, the flavoring liquid absorbed into the lower region of the inner side surface TF_IS of the tubular rod TF may be evenly diffused from a lower side region to an upper side region of the tubular rod TF, as in the case of the flavoring nozzle 1310 illustrated in FIG. 2.

FIG. 4 is a schematic diagram for describing a tube filter production device according to some other embodiments of the present invention.

Referring to FIG. 4, a tube filter production device 3000 may include a tube filter exterior forming case 3100, a steam chamber 3200, a tube filter forming bar 3300, and a cooling member 3400.

The tube filter exterior forming case 3100, the steam chamber 3200, and the tube filter forming bar 3300 of the tube filter production device 3000 may have substantially the same configurations as the tube filter exterior forming case 1100, the steam chamber 1200, and the tube filter forming bar 1300 of the tube filter production device 1000 described above with reference to FIGS. 1 and 2. Hereinafter, for the sake of simplification of description, only the differences from the tube filter production device 1000 described above with reference to FIGS. 1 and 2 will be described.

The cooling member 3400 configured to cool the tubular rod TF heated by steam may be disposed between a steam nozzle 3210 of the steam chamber 3200 and a flavoring nozzle 3310 of the tube filter forming bar 3300.

Due to the cooling member 3400, the tubular rod TF may have a temperature and hardness optimized for absorption and diffusion of the flavoring liquid, and an optimum separation distance L1 between the flavoring nozzle 3310 and the steam nozzle 3210 may be decreased. Accordingly, since the size of the tube filter production device 3000 may be reduced and cooling time may be shortened, process efficiency may be maximized.

In some embodiments, in the case in which the cooling member 3400 is disposed between the steam nozzle 3210 and the flavoring nozzle 3310 of the tube filter forming bar 3300, the separation distance L1 between the flavoring nozzle 3310 and the steam nozzle 3210 may be in a range of about 180 mm to 300 mm.

Meanwhile, the cooling member 3400 may cool the tube filter exterior forming case 3100 as illustrated in FIG. 4 to indirectly cool the tubular rod TF, but unlike this, the cooling member 3400 may also directly cool the tubular rod TF by, for example, supplying cold air into the tube filter exterior forming case 3100. A cooling method of the cooling member 3400 may be air-cooling or water-cooling, but the present invention is not limited thereto.

FIG. 5 is a schematic diagram for describing a tube filter production device according to still some other embodiments of the present invention.

Referring to FIG. 5, a tube filter production device 4000 may include a tube filter exterior forming case 4100, a steam chamber 4200, a tube filter forming bar 4300, and a conveying member 4500.

The tube filter exterior forming case 4100, the steam chamber 4200, and the tube filter forming bar 4300 of the tube filter production device 4000 may have substantially the same configurations as the tube filter exterior forming case 1100, the steam chamber 1200, and the tube filter forming bar 1300 of the tube filter production device 1000 described above with reference to FIGS. 1 and 2. Hereinafter, for the sake of simplification of description, only the differences from the tube filter production device 1000 described above with reference to FIGS. 1 and 2 will be described.

The tube filter forming bar 4300 may extend downstream to protrude from a downstream end 4100E of the tube filter exterior forming case 4100. That is, a flavoring nozzle 4310 of the tube filter forming bar 4300 may be disposed downstream of the downstream end 4100E of the tube filter exterior forming case 4100. In other words, a flavoring liquid may be discharged from the flavoring nozzle 4310 while the tubular rod TF is conveyed by the conveying member 4500 after being exposed out of the tube filter exterior forming case 4100.

In some embodiments, the tubular rod TF may be naturally cooled by outside air while being conveyed by the conveying member 4500.

In some other embodiments, the conveying member 4500 may have a cooling unit (not illustrated) configured to cool the tubular rod TF. For example, the cooling unit may be a suction unit configured to suction moisture and air from inside the tubular rod TF. That is, the conveying member 4500 may be a suction rail configured to convey the tubular rod TF while cooling the tubular rod TF.

In the case in which the conveying member 4500 is the suction rail, the suction rail may have a length L2 in a range of about 100 mm to 1,000 mm in the longitudinal direction of the tubular rod TF (that is, a direction D1 in which the tubular rod TF advances).

In this case, flavoring using the flavoring nozzle 4310 may be performed along with a suction process using the suction rail. Here, "flavoring is performed along with the suction process" may be broadly interpreted. That is, the flavoring using the flavoring nozzle 4310 may be performed in the middle of the suction process using the suction rail, immediately after the suction process starts, simultaneously with the start of the suction process, or before the suction process starts.

Preferably, the flavoring using the flavoring nozzle 4310 may be performed at the time when the suction process using the suction rail is about 70% to 90% completed, preferably, about 75% to 85% completed. That is, the flavoring nozzle 4310 may be disposed to be closer to a downstream end of the suction rail (that is, the conveying member 4500) than to an upstream end thereof. For example, in the case in which the length L2 of the suction rail is about 500 mm, the flavoring nozzle 4310 may be disposed at a position at which the flavoring nozzle 4310 is spaced apart from the upstream end of the suction rail by a distance in a range of about 350 mm to 450 mm (for example, about 400 mm) and is spaced apart from the downstream end of the suction rail by a distance in a range of about 50 mm to 150 (for example, about 100 mm).

In this case, the suction process before falling of the flavoring liquid may serve to cool the tubular rod TF while conveying the tubular rod TF, and the suction process after the falling of the flavoring liquid may serve to allow the flavoring liquid to be evenly diffused to the inner region of the tubular rod TF while conveying the tubular rod TF.

Although not illustrated, the tube filter having a flavored inner portion that is produced using the tube filter production device according to each of the embodiments described above may be used as a component of a combustion-type cigarette or a non-combustion type cigarette that is inserted into an aerosol generation device and the like and heated to generate an aerosol.

In some embodiments, the tube filter having a flavored inner portion may be included in a filter portion of the combustion-type cigarette. As a specific example, in the case in which the filter portion is a monofilter, the filter portion may consist of the tube filter having a flavored inner portion, and in the case in which the filter portion is made up of two or more filters, at least one of the two or more filters may consist of the tube filter having a flavored inner portion.

In some other embodiments, the tube filter having a flavored inner portion may be a component of the non-combustion type cigarette. Specifically, the tube filter having a flavored inner portion may be employed as at least one of a support structure configured to prevent a material inside a smoking material portion from being pushed in the downstream direction in a process in which the non-combustion type cigarette is inserted into an aerosol generation device, a cooling structure configured to cool an aerosol generated as the aerosol generation device heats the smoking material portion, and a front-end plug that abuts the smoking material portion upstream of the smoking material portion to prevent the material inside the smoking material portion from falling out of the cigarette.

Hereinafter, the components of the present invention and the advantageous effects according thereto will be described in more detail using examples and comparative examples. However, the examples are merely for describing the present invention in more detail, and the scope of the present invention is not limited by the examples.

For a clearer understanding of experimental examples which will be described below, description will be given below with reference to FIGS. 6 and 7.

FIG. 6 is a view illustrating an example of a state in which an inner portion of a smoking article tube filter is being flavored according to some embodiments of the present invention, and FIG. 7 shows pictures in which a first region of a tube filter was cut and unfolded to check whether an inner portion of the tube filter was uniformly flavored.

Since the tubular rod TF, the shape of a hollow TF_H inside the tubular rod TF, and the shape, structure, size, and the like of the tube filter forming bar 1300 have been simplified and illustrated in FIG. 6 for the sake of clear description, the present invention is, of course, not limited thereto.

Also, for the sake of clear description, the tubular rod TF illustrated in FIG. 6 has been illustrated as being partitioned into two regions, i.e., a first region TF1 corresponding to a lower portion of the tubular rod and a second region TF2 corresponding to an upper portion of the tubular rod, but, of course, the first and second regions are not physically partitioned. The tubular rod TF may refer to the tube filter before it is cut into a plurality of unit tube filters. However, the terms "tubular rod" and "tube filter" may be interchangeably used as necessary in the following description.

EXAMPLE 1

Using a tube filter forming bar, an inner portion (that is, a hollow TF_H) of a tubular rod was flavored using a flavoring liquid including about 70 wt % menthol and about 30 wt % propylene glycol (PG). A small amount of colored pigment was added to the flavoring liquid to evaluate, by visual inspection, whether the inner portion was uniformly flavored.

A tubular rod having an outer diameter of about 7.2 mm and an inner diameter of about 2.5 mm was produced. The amount of flavoring liquid per mm that was added to the tubular rod as the tubular rod moved in a longitudinal direction D1 in a tube filter production device was about 0.1 mg, and a diameter of a flavoring nozzle used was about 1.0 mm.

Although not illustrated, as described above, high-temperature, high-pressure steam might have been sprayed onto the tubular rod by a steam nozzle before the flavoring liquid was added to the tubular rod. The flavoring nozzle was disposed to be spaced apart from the steam nozzle by about 500 mm in the longitudinal direction D1. The flavoring liquid free-fell from the flavoring nozzle and was absorbed into a first region TF1 of the tubular rod.

EXAMPLE 2

A tubular rod was produced under the same conditions as in Example 1 except that the amount of flavoring liquid per mm that was added to the tubular rod was about 0.3 mg.

EXAMPLE 3

A tubular rod was produced under the same conditions as in Example 1 except that a flavoring nozzle having a diameter of about 1.3 mm was used and the amount of flavoring liquid per mm that was added to the tubular rod was about 1.2 mg.

EXAMPLE 4

A tubular rod was produced under the same conditions as in Example 3 except that the amount of flavoring liquid per mm that was added to the tubular rod was about 1.5 mg.

Experimental Example 1

Setting of Amount of Flavoring Liquid to Allow Inner Portion of Tube Filter to be Uniformly Flavored In order to evaluate whether the inner portion of the tube filter was uniformly flavored, the tubular rods produced by adjusting the amount of flavoring liquid as in Examples 1 to 4 described above were evaluated.

FIG. 7 shows pictures in which the first region TF1 of the tubular rod (more specifically, the lower region of the tubular rod to which the flavoring liquid was directly added by free fall) was cut and unfolded to check whether the inner portion of the tube filter was uniformly flavored. Table 1 shows results of checking whether the inner portion of the tube filter was uniformly flavored according to Examples 1 to 4.

TABLE 1

| Classification | Amount of flavoring liquid per mm (mg) | Remarks |
|---|---|---|
| Example 1 | 0.1 | Non-uniformly flavored |
| Example 2 | 0.3 | Uniformly flavored |
| Example 3 | 1.2 | Uniformly flavored |
| Example 4 | 1.5 | Uniformly flavored / Flavoring liquid flowed down |

As shown in Table 1 and FIG. 7A, discontinuation of the flavoring liquid occurred in the direction D1 in the tubular rod of Example 1 in which the amount of flavoring liquid per mm was 0.1 mg, and accordingly, it was confirmed that the inner portion of the tubular rod was not uniformly flavored in the longitudinal direction. As shown in FIG. 7B, discontinuation of the flavoring liquid did not occur in the tubular rod of Example 2. It was confirmed that, in the tubular rod of Example 3 shown in FIG. 7C, discontinuation of the flavoring liquid did not occur, and the flavoring liquid was more uniformly applied throughout the inner portion of the tubular rod. The tubular rod of Example 4 was also confirmed to be uniformly flavored, but as the flavoring liquid added to the inner portion of the tubular rod was excessively diffused to an outer side surface of the tubular rod, the flavoring liquid flowed down to the outside the tubular rod. Accordingly, it was confirmed that a flavoring characteristic was excellent in the case in which the amount of flavoring liquid per mm was in a range of about 0.3 mg to 1.2 mg, preferably, in a range of 0.5 mg to 0.9 mg.

Meanwhile, although not mentioned above as an example, in an experiment in which a diameter of a flavoring nozzle 1310 was 0.7 mm and the amount of flavoring liquid per mm was in a range of about 0.3 mg to 1.2 mg, a nozzle blockage problem occurred due to occurrence of menthol crystallization, and accordingly, the result of the corresponding experiment was excluded from Table 1 above. Also, in an experiment in which the diameter of the flavoring nozzle 1310 was 1.3 mm and the amount of flavoring liquid per mm was in a range of about 0.1 mg to 0.7 mg, the flavoring liquid fell irregularly due to surface tension of the flavoring liquid, and thus the result of this experiment was also excluded from Table 1 above.

Through the results described above, it was confirmed that a uniform flavoring characteristic was the best in the case in which the amount of flavoring liquid per mm that was applied to the inner portion of the tube filter was in a range of 0.3 mg to 1.0 mg. More preferably, using the flavoring nozzle 1310 having a diameter in a range of 0.8 mm to 1.1 mm to apply the amount of flavoring liquid per mm that is in a range of 0.3 mg to 0.7 mg or using the flavoring nozzle 1310 having a diameter in a range of 1.2 mm to 1.4 mm to apply the amount of flavoring liquid per mm that is in a range to 0.7 mg to 1.0 mg was confirmed to be the most effective in addressing the menthol crystallization occurrence issue and securing uniformity of flavoring.

EXAMPLE 5

A tubular rod was produced under the same conditions as in Example 1 except that the amount of flavoring liquid per mm was about 0.6 mg. The produced tubular rod was stored for about 48 hours, and then the first region TF1 and a second region TF2 of the tube filter were physically separated by cutting.

Experimental Example 2

Evaluation of Diffusion of Flavoring Liquid at Inner Portion of Tube Filter

In order to check whether a flavoring liquid was diffused at an inner portion of a tube filter, content of menthol included in each physically-separated region of the tube filter of Example 5 was analyzed, and results thereof are shown in Table 2.

TABLE 2

| | Total amount of flavoring | Amount of added | Amount of residual menthol | | Upper portion of filter (1/2) | | Lower portion of filter (1/2) | |
|---|---|---|---|---|---|---|---|---|
| Classification | liquid (mg/80 mm) | menthol (mg/80 mm) | Content (mg) | CV (%) | Content (mg) | Proportion (%) | Content (mg) | Proportion (%) |
| Example 5 | 48 | 33.6 | 32.2 | 0.9 | 15.3 | 47.5 | 16.9 | 52.5 |

As shown in Table 2, it can be seen that about 96% of the total amount of menthol added to the tubular rod remained in the tubular rod, and thus the amount of flavoring liquid lost during a flavoring process and the amount of flavoring liquid lost during a storage period of the tubular rod after production thereof were statistically insignificant (less than 4%). Also, there was no significant difference between the amount of residual menthol (52.5%) in the first region TF1, which is the lower region of the tubular rod, and the amount of residual menthol (47.5%) in the second region TF2, which is the upper region of the tubular rod. In this way, it was confirmed that menthol included in the flavoring liquid added to the hollow of the first region TF1 was evenly diffused in the first region TF1, that is, throughout the tube filter.

COMPARATIVE EXAMPLE 1

A tubular rod was produced under the same conditions as in Example 5 except that a flavoring nozzle was disposed to be spaced apart from a steam nozzle by about 200 mm.

COMPARATIVE EXAMPLE 2

A tubular rod was produced under the same conditions as in Example 5 except that a flavoring nozzle was disposed to be spaced apart from a steam nozzle by about 800 mm.

COMPARATIVE EXAMPLE 3

A tubular rod was produced under the same conditions as in Example 5 except that a suction rail having a length of 200 mm was used and a flavoring nozzle was disposed to be spaced apart from a downstream end of the suction rail by about 100 mm.

EXAMPLE 6

A tubular rod was produced under the same conditions as in Comparative Example 3 except that a suction rail having a length of 500 mm was used and a flavoring nozzle was disposed to be spaced apart from a downstream end of the suction rail by about 100 mm.

EXAMPLE 7

A tubular rod was produced under the same conditions as in Example 6 except that the flavoring nozzle was disposed to be spaced apart from the downstream end of the suction rail by about 250 mm.

COMPARATIVE EXAMPLE 4

A tubular rod was produced under the same conditions as in Example 6 except that the flavoring nozzle was disposed to be spaced apart from the downstream end of the suction rail by about 400 mm.

COMPARATIVE EXAMPLE 5

A tubular rod was produced under the same conditions as in Comparative Example 4 except that a suction rail having a length of 1,000 mm was used and a flavoring nozzle was disposed to be spaced apart from a downstream end of the suction rail by about 600 mm.

Experimental Example 3

Evaluation of Flavor Loss According to Different Flavoring Conditions

In order to check the extent of flavor loss according to different conditions of the process of flavoring an inner portion of a tube filter, the amount of menthol added during production of the tube filter and the amount of menthol contained in the produced tube filter were analyzed, and results thereof are shown in Table 3.

TABLE 3

| Classification | Separation distance between steam nozzle and flavoring nozzle (mm) | Length of suction rail (mm) | Separation distance between flavoring nozzle and downstream end of suction rail (mm) | Amount of residual menthol (mg) | Amount of residual menthol with respect to amount of added menthol (%) |
|---|---|---|---|---|---|
| Comparative Example 1 | 200 | — | — | 31.8 | 94.6 |
| Example 5 | 500 | — | — | 32.3 | 96.1 |
| Comparative Example 2 | 800 | — | — | 27.0 | 80.4 |
| Comparative Example 3 | 500 | 200 | 100 | 31.9 | 94.9 |
| Example 6 | | 500 | 100 | 32.8 | 97.6 |
| Example 7 | | | 250 | 32.5 | 96.7 |
| Comparative Example 4 | | | 400 | 30.1 | 89.6 |
| Comparative Example 5 | | 1,000 | 600 | 26.7 | 79.5 |

Referring to Table 3, it was confirmed that flavor loss due to high-temperature steam that essentially accompanies in the process of forming and producing a tube filter was generally not large in all of the comparative examples and examples when the inner portion flavoring method was employed. However, it was confirmed that, even when the same amount of menthol (33.6 mg/80 mm) was added in the flavoring process, there was a statistically significant difference in the amount of residual menthol among the examples and comparative examples according to the separation distance between the flavoring nozzle and the steam nozzle, the length of the suction rail, and the relative positional relationship between the suction rail and the flavoring nozzle.

Specifically, according to the results of Comparative Examples 1 and 2 and Example 5, it can be seen that flavor loss was the smallest in the case in which the separation distance between the flavoring nozzle and the steam nozzle was in a range of about 300 mm to 600 mm. Particularly, in the case of Comparative Example 2, a considerably large amount of flavor loss (about 19.6%) was observed. This is assumed to be due to, since a flavoring liquid spraying position was farther from a steam spraying position than necessary, the tube filter being hardened more than the extent of hardening optimal for addition and diffusion of flavoring liquid while the tube filter was being conveyed to the flavoring nozzle.

According to the results of Comparative Examples 3 to 5 and Examples 6 and 7, it can be seen that the amount of residual flavor generally increased in the case in which the suction rail was also used during flavoring. Particularly, it can be seen that flavor loss was the smallest in the case in which the length of the suction rail was in a range of about 300 mm to 700 mm and the flavoring nozzle was located at a downstream side of the suction rail or in an intermediate region thereof (Example 6 or Example 7). It can be seen that a statistically significant effect due to suctioning was not observed in the case in which the length of the suction rail was less than a reference value (Comparative Example 3), and when the length of the suction rail exceeded the reference value and flavoring was performed at an upstream side of the suction rail (Comparative Example 5), it was not effective in terms of reducing flavor loss due to a reason similar to that described above in relation to Comparative Example 2.

Experimental Example 4

Evaluation of Physical Properties of Tube Filter According to Different Flavoring Conditions In order to examine changes in physical properties of a tube filter according to different flavoring conditions, the weight, circumference, inner diameter, roundness, and hardness of the tubular rods of Examples 5 to 7 described above were analyzed, and results thereof are shown in Table 4.

TABLE 4

| Classification | | Circumference | Inner diameter | Weight | Roundness | Hardness |
|---|---|---|---|---|---|---|
| No. | Days passed | (mm) | (mm) | (mg) | (%) | (%) |
| Example 5 | 0 | 22.43 | 2.46 | 740.2 | 97.4 | 93.4 |
| | 30 | 22.41 | 2.45 | 739.9 | 97.3 | 93.6 |
| Example 6 | 0 | 22.33 | 2.48 | 737.4 | 97.1 | 93.0 |
| | 30 | 22.32 | 2.49 | 735.7 | 97.1 | 93.1 |
| Example 7 | 0 | 22.41 | 2.47 | 733.8 | 97.5 | 94.0 |
| | 30 | 22.40 | 2.48 | 732.1 | 97.5 | 93.8 |

As shown in Table 4, it was confirmed that all of the tubular filters of Examples 5 to 7 met all mass production standards without any statistically significant difference in physical properties according to flavoring conditions. A smoking article filter according to the embodiments and a smoking article including the filter may reduce the hand smell and the bad breath caused by smoking.

Those of ordinary skill in the art related to the present embodiments should understand that the present invention may be implemented in modified forms within the scope not departing from essential characteristics of the above description. Therefore, the methods disclosed herein should be considered as illustrative rather than limiting. The scope of the present invention is defined by the claims below rather than by the above description, and all differences within the scope equivalent to the claims should be interpreted as falling within the scope of the present invention.

What is claimed is:

1. A tube filter production device for producing a smoking article tube filter, the tube filter production device comprising:

a tube filter exterior forming case into which one or more filter tows are introduced and from which a tubular rod formed from the one or more filter tows is discharged;

a tube filter forming bar extending in an inner region of the tube filter exterior forming case and configured to form a hollow of the tubular rod;

a steam chamber having at least one steam nozzle in communication with the inner region of the tube filter exterior forming case and configured to supply steam to the one or more filter tows through the steam nozzle; and a conveying member configured to convey the tubular rod discharged from the tube filter exterior forming case, wherein the tube filter forming bar includes:

a forming bar body portion which has a first duct extending in a longitudinal direction of the tube filter forming bar;

a forming bar tip which is coupled to a downstream end of the forming bar body portion and has a second duct that is in fluid communication with the first duct; and a flavoring nozzle formed in a downstream end of the forming bar tip and configured to deliver a flavoring liquid or a moisturizing liquid supplied through the first duct and the second duct to the hollow of the tubular rod, wherein the flavoring nozzle ejects the flavoring liquid or the moisturizing liquid in a radial direction such that the flavoring liquid or moisturizing liquid is absorbed into an entire region of the inner side surface of the tubular rod, wherein the tube filter forming bar extends downstream to protrude from a downstream end of the tube filter exterior forming case, and wherein the flavoring nozzle is disposed in a region that overlaps with the conveying member in a travel path of the filter tows.

2. The tube filter production device of claim 1, wherein a diameter of the second duct is smaller than or equal to a diameter of the first duct.

3. The tube filter production device of claim 2, wherein the diameter of the first duct is in a range of 1.5 mm to 4 mm, and the diameter of the second duct is in a range of 0.8 mm to 2.5 mm.

4. The tube filter production device of claim 3, wherein the forming bar tip is screw-coupled to the forming bar body portion.

5. The tube filter production device of claim 1, wherein the flavoring nozzle of the tube filter forming bar is spaced apart from the steam nozzle by a distance of 180 mm to 600 mm in a downstream direction.

6. The tube filter production device of claim 1, wherein the steam chamber has a plurality of steam nozzles, and the flavoring nozzle of the tube filter forming bar is spaced apart from a first steam nozzle located most downstream among the plurality of steam nozzles by a distance of 180 mm to 600 mm in a downstream direction.

7. The tube filter production device of claim 1, wherein an inner diameter of the tube filter exterior forming case is in a range of 3 mm to 10 mm, an outer diameter of the tube filter forming bar is in a range of 2 mm to 4.5 mm, and an inner diameter of the tube filter forming bar is in a range of 0.8 mm to 2 mm.

8. The tube filter production device of claim 1, further comprising a cooling member configured to cool the tubular rod directly or indirectly, wherein the cooling member is located between the steam nozzle and the flavoring nozzle.

9. The tube filter production device of claim 1, wherein:

the conveying member is a suction rail having a suction unit configured to discharge air and moisture inside the tubular rod to the outside of the tubular rod; and the flavoring nozzle is disposed to be closer to a downstream end of the suction rail than to an upstream end of the suction rail.

10. A tube filter production method for producing a smoking article tube filter, the tube filter production method comprising:

guiding at least one filter tow to be formed into a shape of a tubular rod by using a tube filter exterior forming case that defines an outer shape of the tubular rod and a tube filter forming bar that defines a hollow inside the tubular rod;

spraying steam onto the at least one filter tow through a steam nozzle in communication with an inner portion of the tube filter exterior forming case to harden the at least one filter tow in the shape of the tubular rod;

supplying a flavoring liquid or a moisturizing liquid supplied from a duct inside the tube filter forming bar to the hollow of the tubular rod through a flavoring nozzle formed at a downstream end of the tube filter forming bar; and simultaneously conveying the tubular rod discharged from the tube filter exterior forming case by a conveying member and discharging air and moisture inside the tubular rod to the outside of the tubular rod, wherein the tube filter forming bar includes:

a forming bar body portion which has a first duct extending in a longitudinal direction of the tube filter forming bar;

a forming bar tip which is coupled to a downstream end of the forming bar body portion and has a second duct that is in fluid communication with the first duct; and the flavoring nozzle formed in a downstream end of the forming bar tip and configured to deliver a flavoring liquid or a moisturizing liquid supplied through the first duct and the second duct to the hollow of the tubular rod, wherein the supplying comprises ejecting the flavoring liquid or the moisturizing liquid in a radial direction such that the flavoring liquid or moisturizing liquid is absorbed into an entire region of the inner side surface of the tubular rod, wherein the tube filter forming bar extends downstream to protrude from a downstream end of the tube filter exterior forming case, and wherein the flavoring nozzle is disposed in a region that overlaps with the conveying member in a travel path of the filter tows.

11. The tube filter production method of claim 10, further comprising, between the spraying of the steam and the supplying of the flavoring liquid or the moisturizing liquid, bringing the tubular rod in contact with outside air to naturally cool the tubular rod or cooling the tubular rod by a cooling member separately provided between the steam nozzle and the flavoring nozzle.

12. The tube filter production method of claim 10, wherein the step of simultaneously conveying the tubular rod discharged from the tube filter exterior forming case and discharging air and moisture inside the tubular rod to the outside of the tubular rod is a suction step, and wherein the flavoring liquid or the moisturizing liquid is supplied to the tubular rod while the suction step is performed.

13. The tube filter production method of claim 10, wherein the flavoring liquid or the moisturizing liquid is supplied in an amount of 0.3 mg to 1.0 mg per 1 mm to the hollow of the tubular rod.

* * * * *